July 13, 1937.  F. R. SHANLEY  2,086,883
ORNIGYRO
Filed Feb. 5, 1934  3 Sheets-Sheet 1

Francis R. Shanley INVENTOR
BY
Monroe B. Bey.
ATTORNEY

Patented July 13, 1937

2,086,883

UNITED STATES PATENT OFFICE 2,086,883

ORNIGYRO

Francis R. Shanley, Washington, D. C.

Application February 5, 1934, Serial No. 709,843

15 Claims. (Cl. 244—17)

The invention relates to heavier than air craft and more particularly has reference to the sustaining surfaces thereof.

It has been recognized for some time that flight of heavier than air craft may be caused or assisted by rotating a set of vanes or airfoils about an axis substantially perpendicular to the longitudinal centerline of the fuselage or the body of the aircraft. This principle has been applied in both the helicopter and the autogyro.

In the helicopter power is transmitted to the sustaining surfaces by fixing them to a shaft which is rotated by some suitable means. While a craft of this type possesses the advantage of vertical ascent and descent, its efficiency is very low. In addition, due to the torque on the rotating shaft and also because the vanes are fixed thereto, the helicopter is extremely difficult to control.

These disadvantages present in the helicopter have been ameliorated in the autogyro by the elimination of the application of torque to the rotor system and also by hinging or pinning the vanes to the rotor hub. However, rotation of the vanes is entirely effected by wind currents created during flight. As a result, the autogyro, like types of airplanes employing sustaining surfaces which are stationary with respect to their bodies, is incapable of vertical ascent.

It is hence the major purpose of this invention to overcome the disadvantages inherent in present day heavier than air craft by converting power, supplied by a suitable source, into a lift or sustaining force acting on a set of sustaining surfaces of an aircraft.

An equally important object of my invention is the provision of means for revolving a rotor system, which includes a set of sustaining surfaces, without mechanically imparting torque to the system.

Another object of my invention is to provide an aircraft having a set of sustaining surfaces or blades which may be oscillated or flapped.

Yet another object of this invention includes the provision of a set of sustaining surfaces for an aircraft, which surfaces may be oscillated about a fixed point, while maintaining their geometrical or "built in" angle of incidence constant.

A further object of the invention is to provide means for oscillating or flapping sustaining blades hinged to a rotor element mounted to freely rotate on a fixed shaft.

Still a further object of this invention is the provision, in an aircraft having a rotor system including blade elements adapted to be oscillated and rotated, of means for timing and directing the transmission of power impulses to the blades to assist in their flapping motion.

A still further object of the invention is to provide means to allow the blades of the rotor on opposite sides of its axis to independently adjust themselves to unbalanced lift forces without affecting the controlled oscillating or flapping motion imparted to them.

Yet a further object of my invention is to employ a universal mounting for the rotor shaft of an aircraft provided with rotating sustaining surfaces.

With these and other objects in view, which may be incident to my improvements, the invention consists in the parts and combination to be hereinafter set forth and claimed, with the understanding that the several necessary elements, comprising my invention, may be varied in construction, proportions, and arrangement, without departing from the spirit of the invention and the scope of the appended claims.

This invention comprehends a heavier than air craft provided with a rotor system comprising a set of sustaining surfaces or blades, maintained at a constant geometrical angle of incidence, and rotated and oscillated by means of a power source in such manner that there is no torque mechanically transmitted to the rotor.

One manner of practically effecting this concept is to mount for free rotation, a rotor element or bearing on a rotor shaft, carried by the fuselage or other part of the airplane. Pivoted or hinged to the bearing are a number of lifting surfaces or blades which are connected through arms to a reciprocating motor which may be mounted on the rotor shaft above the rotor. On the actuation of the motor, the blades are oscillated or flapped. Flapping of the rotor blades causes their rotation and creates a lifting force on each blade surface, which force is utilized to effect flight. Included within the scope of this invention is a control device for the motor just mentioned, which device controls the timing and direction of the power impulses imparted to the rotor blades to assist in their flapping.

In addition, the invention comprehends means for allowing the rotor blades on opposite sides of the rotor axis to independently adjust themselves to unequal lifting forces without interfering with their induced oscillation. This is accomplished by the construction expedient of hinging the motor to the top of the rotor shaft or by a special arrangement of lever arms attached by ball and socket joints.

Also contemplated by the invention is the mounting of the rotor shaft so that its angle with respect to either axis of the body of the aircraft may be adjusted at will in order to provide a simple and easy control for the craft and to permit the utilization of the lifting force for producing horizontal flight. To this end the rotor shaft is secured to a suitable support on the fuselage or other part of the plane through a universal or ball and socket joint. An extension of the rotor shaft or other suitable means is provided so that the pilot may set the rotor shaft and consequently the rotor in the desired position.

As is well known, during the movement of an airfoil through the air a lift and a drag force are created, both of which forces may be resolved into a single resultant force commonly denoted as "R". The resultant force R acts at the center of pressure of the airfoil, which latter assumes various positions along the chord line of the airfoil depending on the angle of attack. Usually the resultant force R acts upwardly for all positive angles of attack and downwardly for most negative angles of attack.

Figures 1, 2, 3:
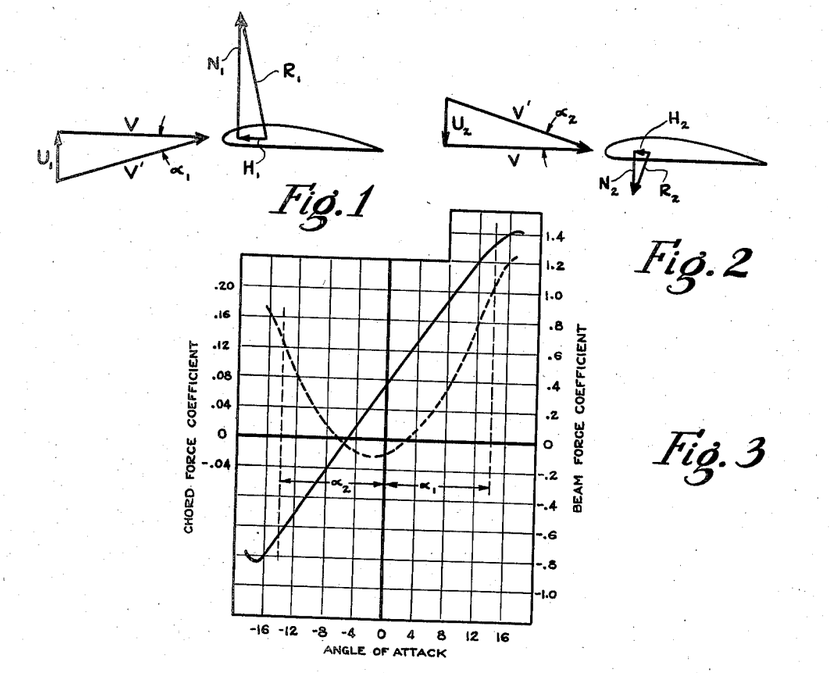
Figures 1 and 2 represent cross sections of an airplane wing at different effective angles of attack.
Figure 3 shows a graph of lift and horizontal forces plotted against angle of attack for a typical airfoil section.

It is important to note that for large angles of attack, whether positive or negative, the resultant R, as shown in Figures 1 and 2, acts in a forward direction or to the left of a vertical line drawn through the point of application of the lift and drag forces. As the angle of attack decreases the direction of the resulting force vector swings rearwardly or to the right of the vertical line just described. Also important is the fact that through the use of trigonometry the resultant force R may be resolved into a horizontal force H and a vertical force N.

These forces, namely H and N, are known respectively as the chord and beam components of the resultant force. The force N acts in a direction perpendicular to the chord of the airfoil and either upwardly or downwardly. On the other hand, the force H is always parallel to the chord but has a direction corresponding to the slope of the resultant R, that is to say, for large angles of attack of the airfoil the chord component is acting forwardly and in value approaches zero as the angle of attack decreases, reversing its direction when the angle of attack becomes small enough to cause the resultant force vector to slant rearwardly.

Bearing in mind the principles just outlined, it will be appreciated that they apply to each blade of a rotor system such as that used in the autogyro. As commonly understood, the wings or rotor blades of an autogyro, which are fixed to the rotor so that their leading edges all point in the direction of rotation, are caused to rotate due to the upward flow of air through the rotor disc.

In the case of vertical descent of the autogyro, the blade elements describe helices as they travel through the air and it is possible to represent the conditions existing at any cross section of a blade by instantaneous linear velocities of the air moving past the blade. Figure 1 may be considered as representing a cross section of a blade of an autogyro which is descending vertically, the vector diagram shown representing the relative wind velocities with respect to the blade. As shown in the vector diagram, this blade, due to its rotation and the descent of the autogyro, is moving through the air with a horizontal velocity V and a downward velocity $U_1$, the resultant $V'$ of these velocities forming an angle $\alpha_1$ with the vector V. (In accordance with common practice the relative velocities of the air with respect to the airfoil are shown, instead of the velocity of the airfoil with respect to the air). For a large angle of attack the resultant force, denoted by $R_1$ in Figure 1, is inclined forwardly thus giving rise to a forward acting component $H_1$. Since by the construction of its rotor, there is practically no frictional resistance to the rotation of a blade of an autogyro about the axis of the rotor, the average of the forces $H_1$ over the blade will if acting forwardly increase the speed thereof, which causes an increase in the value of the vector V. As a result of this increase in velocity there is a decrease in the angle $\alpha_1$, which angle it will be appreciated is the angle of attack.

With the above change in the average effective angle of attack, the resultant force vector $R_1$ will tilt toward the rearward or trailing edge of the blade thus causing $H_1$ to approach zero. When $R_1$ has swung to a position perpendicular to a horizontal plane, the value of $H_1$ will have reached zero and further movement of $R_1$ rearwardly will cause the force $H_1$ to act in a rearward direction.

This change in the value and the direction of the component $H_1$ will tend to slow down the rotor thereby decreasing V and increasing the angle of attack with the result that the forward force $H_1$ will again tend to be built up and the rotational speed of the rotor increased. In other words, the forward speed V will always seek and rapidly attain a certain value for which the forces will be in equilibrium, in which case the average or net value of the horizontal component H will be practically equal to zero. It will be appreciated that by the suitable design of the airfoil forming the blade of the rotor, the maximum value of $H_1$ when acting rearwardly may be kept extremely small.

From the foregoing remarks, relative to the position of the resultant of the lift and drag forces with respect to a vertical line through the point of application of the resultant, it may be noted that a forward acting component of the resultant may be obtained whether the airfoil is vertically ascending or descending. Such a condition is disclosed in Figure 2 which shows by vectors the conditions existing on an airfoil section like that of Figure 1, where in Figure 2 the airfoil is ascending vertically through the air with a velocity $U_2$ equal to the velocity $U_1$ of Figure 1. As will be well understood the vertical velocity vector of Figure 2 has its direction reversed from that in Figure 1, that is to say the airfoil is operating at a negative angle of attack $\alpha_2$ which is numerically equal to the positive angle of attack $\alpha_1$ shown in Figure 1.

It will be noted however that the vertical force $N_2$ in Figure 2 is opposite in direction from the force $N_1$. If the airfoil employed for the blade had a section which was symmetrical about its chord, the vertical forces $N_1$ and $N_2$ would be equal in magnitude for the same resultant velocities and opposite angles of attack, with the result that the average lifting force N for the two conditions would be equal to zero. This condition may be readily overcome, however, by the selection of an unsymmetrical airfoil section, such as shown in the drawings, and also by suitably choosing its fixed angle of incidence with the horizontal. With such an arrangement the upward force $N_1$ will always be greater in magnitude than the downward force $N_2$.

Figure 4:
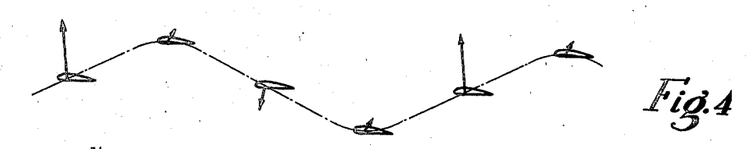
Figure 4 discloses the developed path of flight of a section of one of the blades of a rotor system associated with an aircraft.

With reference to Figure 4 and in view of the foregoing explanation it is apparent that if an airfoil were made to travel from right to left forwardly and vertically along the developed flight path shown, the conditions existing with respect to Figures 1 and 2 would occur consecutively with the effect that the average forward acting component H would tend to cause the average horizontal speed V to increase, thus diminishing the angles $\alpha_1$ and $\alpha_2$ until the average value of H became zero. In Figure 4 an airfoil section is shown at several different points along the developed path of flight, the vector extending from the section at each point represented being used to indicate the magnitude, position, and direction of the resultant force R.

Figure 5:
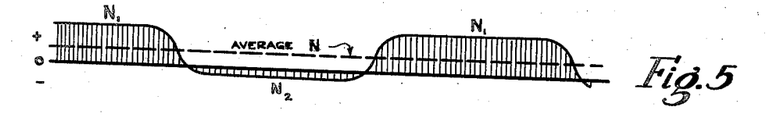
Figures 5 and 6 are based on Figure 4 and show respectively the vertical and horizontal forces developed at any position of flight shown in Figure 4.
Figure 6:
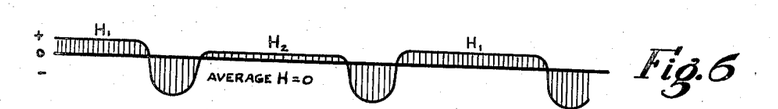

Figures 5 and 6 which are based on Figure 4, show the values of the forces H and N for any point on the developed path of flight portrayed in Figure 4. While in Figure 5 the variations of N are given, Figure 6 gives those of the force H. To be observed is the fact that the average value of N is always positive, while from an inspection of Figure 6, it may be seen that the average value of H is zero. It will be noted that a rearward acting force is obtained only for a relatively short period of time, at the crests and troughs of the wave-like developed path of flight.

That the conditions disclosed in Figures 4 to 6 can exist is apparent from an inspection of Figure 3, upon which Figures 4 to 6 are built up. A graphical representation for a Clark Y airfoil is shown in Figure 3 in which two characteristic curves are disclosed. Obviously other types of airfoils may be used in practicing my invention. However, the Clark Y airfoil has been made the subject of illustration and explanation because it is so well known. In the full line curve of Figure 3 the beam component or vertical force N is plotted in coefficient form, against the angle of attack $\alpha$, upwardly acting or positive vertical force coefficients being shown above the horizontal axis, while a positive angle $\alpha$ is measured to the right of the vertical axis. It will be appreciated that by far the major portion of the full line curve is on the positive side of the axis and a portion thereof is still positive even when a negative angle of attack exists.

The dotted line curve of Figure 3 represents the coefficient for the chord component or horizontal component H for the same airfoil and as is apparent, is positive or acting forwardly when above the horizontal. At two points on the curve, it may be seen that the value of this coefficient reaches zero and between these two points the force H is, for a very short space, acting rearwardly or negatively.

With reference to the conditions existing in Figures 1 and 2, the coefficients for the vertical force N and the horizontal force H, existing for the angle of attack $\alpha_1$, are denoted on the full line and the dotted line curves by their intersection with a vertical dotted line. Similarly the conditions on the airfoil section disclosed in Figure 2 for the horizontal and vertical forces at the given angle of attack $\alpha_2$ are likewise shown on the two curves forming Figure 3.

It should be particularly borne in mind that the foregoing explanation as well as that to follow has assumed the employment of an airfoil section which has a fixed angle of incidence with respect to the horizontal. Further it may be appreciated that if a number of airfoil sections were arranged to comprise a rotor, which is free to rotate about an axis, that on oscillating or flapping the airfoils upwardly and downwardly, the entire rotor system would be revolved and at the same time a lifting force on each airfoil blade would be created.

Figure 8:
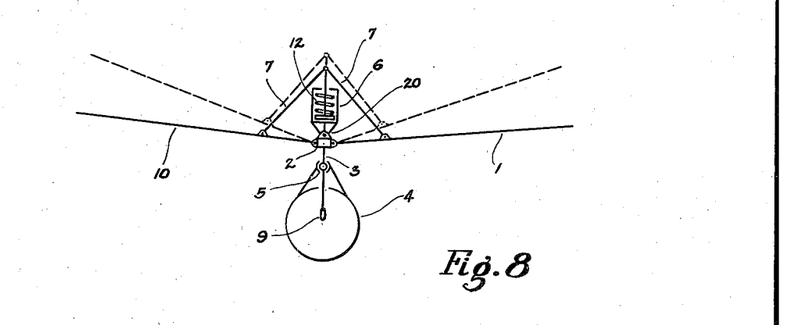
Figures 8 and 9 are diagrammatic showings of a typical installation of the invention and disclose the mechanical action of the wings.
Figure 9:
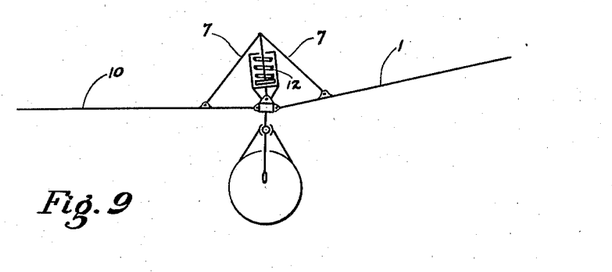

A simple manner of applying this theory is shown in Figures 8 and 9 which, besides representing in diagrammatic form an elevation through a typical installation of the invention on an aircraft, show the mechanical movement of the wings. In Figure 8 the reference numerals 1 and 10 represent blades or wings having an airfoil section. These blades, 1 and 10, are pivoted at their inner ends in any conventional manner, such for example as by a pin, to a bearing 2. The bearing 2 is mounted on the vertical shaft 3 so as to be freely rotatable thereon, shaft 3 being attached to the body or fuselage of the aircraft by means of a universal or ball and socket joint, given the reference numeral 5. In order to impart flapping motion to the blades 1 and 10 a suitable reciprocating motor 6 is pivoted at 20 to the upper end of the shaft 3. The power take off means of the motor 6, as shown at the upper end of the motor, is pivotally attached to two arms 7—7, which are in turn pinned or otherwise pivotally connected to the blades 1 and 10.

Of course in practice, more than two blades may be employed. Where such is followed out the hinge joints on the blades are replaced by universal or ball and socket joints.

With respect to the reciprocating motor 6, this may be of any well known design and may be actuated by fluid pressure, electrically or mechanically. Without departing from the scope of the invention, the source of power could, if desired, be located in the fuselage and suitable means could be provided to transmit reciprocating motion to the arms 7—7.

One possible manner of constructing a motor such as indicated in Figure 8 would include a cylinder with a piston therein driven by fluid pressure or working on the internal combustion motor principle. The piston rod would extend through the cylinder and at its outer end could, of course, be attached to the arms 7—7 which are connected to the blades. It will also be appreciated that in mounting the motor it may be placed below the blade-like sustaining surfaces instead of above them.

The action of the motor 6 will transmit its power to the blades and will cause them to flap or oscillate between their original full line position shown in Figure 8 and the position indicated by the dotted lines.

From the foregoing theory it is evident that flapping of a given speed and magnitude will produce rotation of blades 1 and 10 about the axis 3, which rotation will be accompanied by a lift force acting on each blade element perpendicular to the blade centerline. The total lift and centrifugal forces acting on the blades will be transmitted to the shaft 3, which will in turn transmit the resultant force to the body 4. It should again be noted that this action is obtained without causing the geometrical angle of incidence of the blades to change. In this connection, it is realized that unavoidable slight structural distortion of the blades may occur due to the forces acting on them. Should such occur, however, it will have a negligible effect on the operation of the system and is not to be considered as mechanically changing the geometrical angle of incidence of the blades for each stroke in order to facilitate their oscillation.

The use of the universal joint 5 will permit the position of the axis 3 to be varied with respect to the body 4, thus affording a means for control of the aircraft by tilting the resultant force vector. Axis 3 is simply extended to form a control lever 9 which can be manipulated by the pilot. For instance, by tilting the axis 3 forward horizontal propulsion through the air is obtained. It will be realized that various modifications in the means for tilting the rotor axis are possible and that, if desired, gearing or other expedients may be suitably employed to facilitate the shifting of the axis 3.

In Figure 9 the advantage of hinging or pivoting the motor to the rotor shaft 3 is illustrated. If it is assumed that in Figure 9 the aircraft is in horizontal flight, there exists a horizontal linear velocity of the rotor system which is perpendicular to the plane of the drawing. This last mentioned velocity is in addition to the rotational velocity of the blades. The surface 1, as the "advancing" blade, will because of its rotation cut the air at a considerably greater speed than the "retreating" blade 10. The lift on the advancing blade 1 will be greater than it would be if the lateral velocity, just mentioned, were absent, while the lift on the retreating blade will be less. Blade 1 hence tends to rise and blade 10 to fall with the result that if the blades were fixedly attached to the rotor bearing the entire aircraft would tend to tilt or bank. It is to meet this condition, which occurs in horizontal flight, that the blades on the autogyro are articulated or hinged to their rotor bearing.

In the present invention this same condition must be considered, the difficulty of providing for it being increased due to the fact that a power source for oscillating the blades is operatively connected to them. It is for this reason that the motor 6 is hinged to the non-rotating rotor shaft. From a study of Figure 9 it may be seen that the angle formed between each arm 7 and the axis of the motor remains constant when the blades seek different positions due to unequal lift forces acting on them, while at the same time the construction allowing this also causes an equal transmission of power to each blade of the rotor. Further it should be noted, that although in the present invention each blade is not individually free to flap, as is true in the autogyro, the construction does permit the blades as a whole to adjust themselves independently of the controlled flapping motion produced by the motor, which motion is not interfered with during adjustment of the blades.

Also it should be noted that the centrifugal forces acting on the blades 1 and 10 will tend to prevent the blades from collapsing upwardly. In order not to rely on this action completely a spring device 12 is added to the motor 6 so that upward coning of the blades will be restricted by a resilient means. As disclosed, the device 12 is merely a spring placed above the piston of the motor 6 so that on the up stroke the piston works against the spring. Of course if desired other means may be employed to positively care for the coning of the blades.

Figure 7:
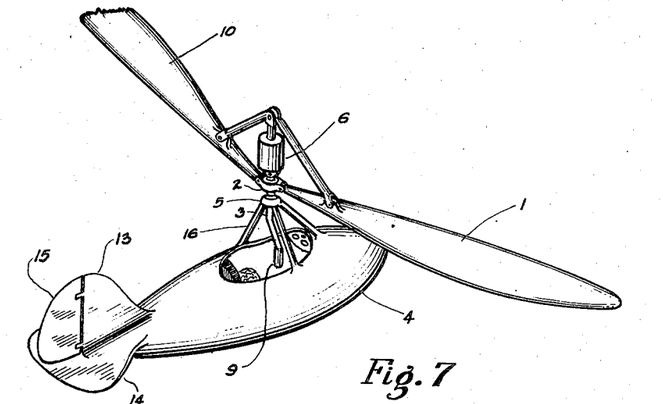
Figure 7 shows one form of application of the invention to an aircraft.

Figure 7 shows one manner of applying the invention to an actual aircraft. In this device only two blades 1 and 10 are shown but it is obvious that any reasonable number can be used, provided that proper balance is maintained. Parts similar to those already described are designated by similar reference numerals and are shown associated with the aircraft body 4 of Figure 7. Any conventional form of tripod 16 or other supporting structure is employed to mount the rotor system and rotor shaft on the aircraft. The body 4 is equipped with fixed stabilizing surfaces 13 and 14 and a rudder 15, which latter is operated in the usual manner. The motor 6, as already pointed out, may be driven by any convenient form of power.

To summarize, the operation of the aircraft shown in Figure 7 is as follows. While at rest on the ground blades 1 and 10 are given a slight initial rotary motion and motor 6 is started. The flapping motion produced in blades 1 and 10 will cause the rotational speed to increase. As the rotational speed increases, the lift from blades 1 and 10 increases until it becomes equal to the total weight of the aircraft. A further increase in power will tend to increase the lift and cause vertical ascent. To produce forward motion, the control lever 9 is pulled back, thereby tilting the axis 3 forwardly and causing part of the lift force from the rotor to be used in propelling the aircraft through the air.

During forward flight the difference in the velocities of the advancing and retreating blades will be offset by the automatic tilting of the entire rotor system with respect to the axis of rotation. Any tendency of the body to side slip or revolve can be checked by proper manipulation of the control lever 9 and the rudder 15.

It has been pointed out that for the purpose of explanation only two blades or sustaining surfaces have been shown associated with the rotor. If more than this number are employed they may be connected to the reciprocating motor arms in a manner similar to that already described. One modification in this construction, which possesses certain advantages when more than one set of blades are used, is disclosed in Figure 10.

Figure 10:
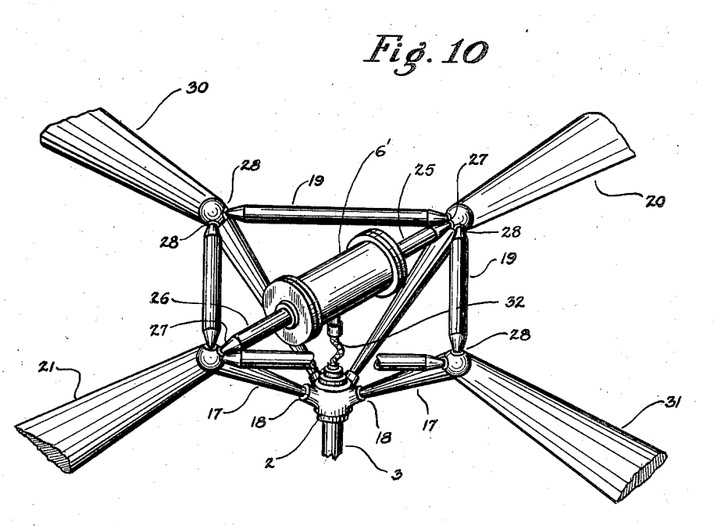
Figure 10 is a foreshortened illustration of one modification of the invention which may be employed when more than two rotating sustaining surfaces are used.

In Figure 10 each of the blades 20, 21, 30, and 31 is provided with an offset 17 at its inner or hub end, the lower end of each offset being connected to the rotor bearing 2 through the use of a ball and socket joint 18. Arms 19, of equal length, are connected to the blades so that adjacent blades are secured to the opposite ends of the same arm 19. In securing the arms 19 to the blades, ball and socket joints 28, located near the offsets, are made use of to provide universal connections. By reason of this construction the arms 19 form in outline the boundaries of a quadrilateral, which tends to be a square unless acted on by forces from the motor.

As a result of this construction it may be appreciated that if two opposite blades, for example 20 and 21, were connected by a diagonal of the quadrilateral and this diagonal were shortened and lengthened, opposite corners of the quadrilateral would alternatively approach and recede from each other as the quadrilateral were distorted with the effect that the blades or airfoils would be oscillated.

To accomplish this end a reciprocating motor 6′, similar to the motor already described, is employed. Motor 6′, however, has at its end opposite to that of its power take off shaft or piston rod 25, an extension arm 26, the longitudinal center line of which forms an extension of the longitudinal center line of the piston rod 25. The outer ends of the piston rod 25 and the extension arm 26 are connected to blades 20 and 21 so that the motor, the piston rod and the extension arm form a diagonal of the quadrilateral made up by the arms 19. Ball and socket joints 27 are employed to secure members 25 and 26 to the blades 20 and 21. Obviously actuation of the motor 6′ will cause the oscillation of the blades of the rotor and their consequent rotation.

The motor 6′ may be connected with a power supply source in the body of the aircraft through a suitable coupling between the motor 6′ and the shaft 3. The type of coupling will depend on the nature of the power transmitting medium. In Figure 10 a flexible tubular coupling 32 employing a rotatable gland is illustrated for the transmission of the power impulses.

One important advantage derived from the use of the four blades, when employed as described, resides in the fact that while two blades on opposite sides of the rotor axis are being forced downwardly, the other two blades are being forced upwardly.

Further, with the use of the modification shown in Figure 10 it is unnecessary to provide a spring device to positively prevent coning of the blades. This is apparent when it is considered that coning is due to an equal upward force acting on each blade. The result, in the construction under consideration, is that equal and opposite forces are transmitted to the arms 19 so that upward movement of the blades or coning is prevented.

Where the blades on opposite sides of the axis of rotation are subjected to unequal forces, as for example in horizontal flight, the ball and socket connections 18 of the blades to the rotor bearing will permit independent adjustment of the blades without interference with their controlled flapping.

Throughout the constructions shown in the drawings it is important to note that each blade is set at a fixed geometrical angle of incidence and that this angle remains unchanged during the operation of the rotor. This expedient obviates the necessity of "feathering" a blade on its upward stroke. That is to say, when the power source moves each blade upwardly it is unnecessary to turn each blade so that its upper and lower surfaces are substantially vertical or otherwise displaced from their position for the downward stroke. This feature not only simplifies the construction of the device but also eliminates the inefficient "wind-mill" action obtained when the angle of attack of an airfoil is not within the most efficient operating range.

Also important is the fact that the blades of the rotor are hinged for movement about their inner ends. By such a construction a true bird like wing flapping or oscillation of each blade is obtained, which, when combined with rotary motion causes each blade element to undergo the same changes in effective angle of attack, regardless of its distance from the axis of flapping. It may be seen that the longitudinal axis of a blade during a down stroke never lies in the same plane at consecutive instants and the same is true in regard to the upstroke of the blade.

The foregoing discussion has presented a general outline of the theory upon which the invention is based and has pointed out how oscillation or flapping of the rotor blades will cause their rotation and how this rotation may be utilized to effect flight. In addition several means for utilizing the power of a motor to cause oscillation of the rotor blades have been described. One other point of refinement must now be taken up, namely the question of when the rotor blades should be oscillated or, to put it another way, when the power impulses should be supplied from the power source for causing this oscillation or flapping of the blades. To explain properly what appear to be the basic principles of this timing of the transmission of the power impulses to the blades a somewhat different type of analysis from any of the foregoing theories is required. Such analysis follows.

Consider one blade of a rotor such as that shown in Figure 7 or 10 and assume that it is rotating about the axis 3 and that it is free to flap in a vertical plane. It will be realized that centrifugal force, due to the rotation of the blade, will tend to force the blade into a horizontal position. To make the analysis simpler, it can be assumed, without introducing any considerable errors, that the air forces acting upwardly on the blade just balance the weight of the blade acting downwardly. (Actually the upward acting air forces must equal the weight of the aircraft and therefore will cause the blades if unrestrained to "cone" upwardly.) Under this latter assumption, the blade would assume a horizontal position in which the net forces would be the centrifugal forces acting radially. These forces, namely the centrifugal forces, depend, of course, on the speed of rotation of the blade about the axis 3.

Keeping in mind the just given assumptions, the formula for the period of oscillation of a simple pendulum can now be applied to the rotor blade by replacing the acceleration of gravity in the formula by the centrifugal acceleration of the blade. The important result thus obtained shows that if suddenly displaced from its neutral horizontal position just assumed, and then released, the rotor blade will tend to oscillate or flap about this assumed stable position. Further, it can be shown that the frequency of oscillation of the rotor blade will be given by the equation $$F = n\sqrt{r/\rho}$$

where, F is the number of complete oscillations per second, n is the number of the revolutions of the blade per second, r is the radius of the center of gravity of the blade measured from the vertical axis of rotation, and ρ is the radius of gyration of the blade, measured from the axis of oscillation.

The formula just given indicates that the natural frequency of oscillation of a blade will be very nearly equal to the number of revolutions per second which the blade makes about its vertical axis of rotation. Obviously if the radius of gyration ($\rho$) should coincide with the radius to the center of gravity ($r$) the frequency as denoted by the formula would exactly equal the rate of rotation, that is to say there would be one complete oscillation of a blade for every revolution of the blade. This condition is very closely approximated by a small heavy ball being whirled at the end of a light string or cord and at the same time oscillating in and out of its mean plane of rotation. In the case of a rectangular shaped object, similar to the rotor blade under consideration it can be demonstrated that the ratio $$\sqrt{r/\rho}$$

becomes about 0.935, indicating that the natural frequency is about 7% less than the rate of rotation.

Still considering the rotor blade as a pendulum, any flapping motion once started will continue until damped out by friction or for some other reason. In the case of the simple pendulum, the damping forces are usually small and the oscillation is very gradually damped. However, in the case of the rotor blade, which is not only flapping but is at the same time cutting the air in a horizontal plane at a relatively high velocity, a strong damping action is caused by the change in the effective angle of attack produced by the flapping motion. This is illustrated in Figures 1 and 2 where velocities $U_1$ and $U_2$ can now be thought of respectively as instantaneous upward and downward relative air velocities occurring at some moment during flapping. It is apparent that a relative upward velocity $U_1$ such as shown in Figure 1, will be created by downward flapping and will be accompanied by a relatively large upward air force $N_1$, which force will oppose the downward flapping. A similar resistance to upward flapping will be developed, as is disclosed in Figure 2. Obviously under such conditions any natural oscillation or flapping of a rotor blade would soon be stopped by the aerodynamic "damping" forces.

The problem can now be treated in a different light by assuming that the blades of a machine such as shown in Figures 7 and 10 are rotating fast enough to supply the lifting force necessary to sustain the aircraft in the air and that they are flapping at their natural frequency of oscillation with an amplitude, or range of flapping motion, sufficient to reduce the average chord forces to zero, as indicated in Figure 6. The problem therefore consists in maintaining the required amplitude of flapping, so that the average chord forces will remain zero and permit the rotation to continue at the same speed. Unless the effects of the strong damping forces previously described are eliminated, the amplitude of flapping will immediately decrease, the average chord forces, no longer being zero, will act to slow down the rotor, and the sustaining force will therefore decrease, causing the aircraft to descend. Hence one purpose of the motor or power source may be thought of as supplying forces to the rotor blades which will counteract the aerodynamic damping forces tending to stop flapping of the blades, and will thereby permit the cycle of operations to continue as described. If the damping forces acting in hovering flight are exceeded by the counteracting forces supplied, the result will be an increase in rotor speed and lift, and, consequently, vertical ascent of the aircraft.

The above analysis, it may be appreciated, is analogous to the simple case of a child's swing which can be kept in oscillation through a large amplitude, even with a heavy occupant, by properly timed forces of relatively small amount. In the case of the application of this theory to the rotor blades, the importance of timing these power impulses or forces is obvious. Particularly is this true since the rotor blades are long and relatively heavy and on account of their large angular inertia would offer considerable resistance to any flapping motion which did not coincide with the natural frequency of oscillation or flapping.

It should be particularly noted that the phenomenon of resonance or natural oscillation cannot easily be employed to eliminate the adverse effects of the inertia of the blades as described above unless the latter are designed so as to oscillate or flap during their rotation. To reciprocate each blade in a vertical plane, for example, would not permit the practical application of the pendulum theory. Moreover, if the blades were reciprocated in a vertical plane, extremely large forces would be required to overcome the inertia of the blades and in addition structural difficulties would be introduced on account of the high inertia loads which would have to be transmitted through the blades.

In order to counteract exactly, at every instant, the already described aerodynamic damping forces, it would be necessary to control the power impulses applied to the blades so that the applied flapping forces varied directly as the rate or angular velocity of the flapping. The applied force would also have to act in the proper direction so as to aid the natural flapping of the blades. It would of course be unnecessary, although desirable, that the former condition be fulfilled exactly, as flapping may be maintained by simply applying the necessary force in the right direction, even though its magnitude does not vary directly as the flapping velocity of the blade. Where the magnitude of the force applied to the blade does not vary in proportion to the magnitude of the damping force, the structural loads due to inertia effects will be somewhat increased.

Figure 11:
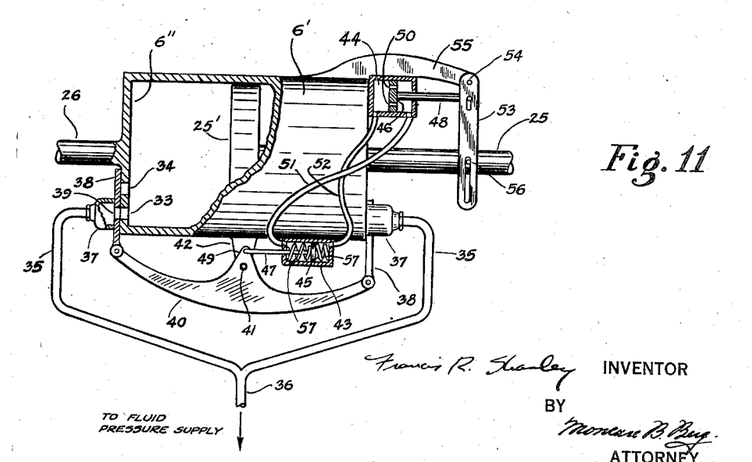
Figure 11 discloses a combination elevational and sectional view, which is in parts more or less diagrammatic, of one type of motor and control device therefor.

A device by which the forces applied to the rotor blades can be made to act in the proper direction at every instant, or with proper timing, is disclosed in the control mechanism associated with the motor 6' shown in Figure 11, the motor and control mechanism being shown in detail in a combination elevational and sectional view, which is in parts more or less diagrammatic. The control device of Figure 11, for the sake of simplifying the drawings, has not been disclosed in Figures 7 through 10. However it will be apparent from the following explanation that the control mechanism shown in Figure 11 can be employed with any of the motors forming the subject of the preceding figures of the drawings.

As shown in Figure 11, a motor 6' similar to that already described, is designated by this general reference numeral. This motor comprises a cylinder 6" with piston 25' and piston rod 25. Also, as shown, the cylinder 6" is provided with an extension arm 26 fixed to the cylinder. In the event that the motor shown in Figure 11 is used with the four bladed rotor of Figure 10, the extension arm 26 and the piston rod 25 are connected to opposite blades in a manner like that already described. On the other hand if only a two bladed rotor, such as that disclosed in Figures 7, 8, and 9, is employed the extension arm 26 may be dispensed with, or considerably shortened.

In Figure 11, each end of the cylinder 6" is provided with an inlet port 33 and an outlet or exhaust port 34. The inlet ports are connected in any suitable manner to branch pipe lines 35 which are in turn connected to a main pipe line 36, leading from a fluid pressure supply source (not shown).

Each inlet port 33 is provided with a valve casing 37 through which there is adapted to slide a plate valve 38. The plate valves are provided with ports 39 which coincide either partially or completely with the inlets 33 when the plate valves are moved. It may be noted that each plate valve is sufficiently long enough to cover its outlet or exhaust port 34 when its inlet port is fully opened. Also it may be observed that when an inlet is closed by reason of the descent of its plate valve, the exhaust on that side of the cylinder is opened.

In order to provide for proper movement of the plate valves so as to open an inlet and exhaust port at opposite ends of the cylinder 6", these valves are suitably connected to a walking beam 40 which may be pivoted at 41 to a mounting member 42 attached in some manner to the cylinder. Obviously actuation or rocking of the walking beam will effectively operate the valve mechanism at each end of the motor cylinder. It is now only necessary to cause this operation of the walking beam to so occur that a power impulse will be transmitted to the rotor blades at the right moment and in the correct direction.

To effect this proper transmission of the power impulses use is made of a sealed fluid pressure system comprising two cylinders 43 and 44, mounted on the main cylinder and respectively provided with pistons 45 and 46, connected respectively to piston rods 47 and 48. For convenience cylinder 43 is termed the valve operating cylinder while cylinder 44 is referred to as the control or timing and directional cylinder.

As shown the piston rod 47 of the valve operating cylinder is attached to an ear 49 fixed to the walking beam. With such an arrangement it will be appreciated that movement of the piston 45 to the right will impart a clockwise motion to the walking beam which will move the plate valve 38 on the left of the motor cylinder into position to open the inlet 33 and close the exhaust port 34 on that side of the motor, while the plate valve on the right will open the exhaust and close the inlet on the right. Obviously movement of the piston 45 to the left will result in opening the inlet port on the right of the motor cylinder and the closing of that on the left, the proper manipulation of the exhaust ports of the cylinder of the motor taking place with such movement of the piston 45.

In regard to the control or timing and direction cylinder it may be observed that the piston thereof is provided with a number of openings or holes 50 extending entirely through the piston. Also suitable ports or orifices at each end of this cylinder are connected through hose or pipe lines 51 and 52 to orifices or ports formed in opposite ends of the cylinder 43, the right hand end of cylinder 44 being connected to the left hand end of the cylinder 43 and the left hand end of the cylinder 44 being connected with the right hand side of cylinder 43. The entire control system formed by the connected cylinders 43 and 44 is filled with an incompressible fluid and sealed. It will hence be understood that if piston 46 is moved so as to compress the working fluid therein, a working pressure will be sent through the pipe lines so as to cause operation of the piston 45 in the valve operating cylinder, with the consequent result of the actuation of the valve mechanisms 38.

In order to accomplish the just described movements of piston 46, its piston rod 48 is suitably secured to a slide link 53 pivoted at 54 to an arm 55, which latter may be mounted on the motor 6' as shown. The link 53 is suitably connected at 56 to the piston rod 25 of the motor. With this arrangement, movement of the piston rod 25 of the motor to the right causes compression of the working fluid on the right of the piston 46, resulting in the movement of piston 45 of the valve cylinder to the right, thereby opening the left inlet port and the right exhaust port of the motor 6'. Movement of the piston 25' to the left effects the opening of the motor inlet port on the left with the closing of that on the right.

If it is assumed that the piston 25' of the motor reaches a zero velocity at the end of each stroke, considering a stroke to the right it will be appreciated that there is a drop in the pressure within the control cylinder on the right of its piston as the velocity of the motor piston diminishes. This is due to the openings or orifices 50, which are of relatively small area, in the piston 46 of the control cylinder. Springs 57 are placed on each side of piston 45 so as to tend to hold the piston in the center of cylinder 43. When the pressure in the control cylinder drops, as described, that on the piston of the valve operating cylinder likewise drops. As soon as the pressure drops below a suitable small value depending on the stiffness of the springs 57, piston 45 will be forced towards the center of its cylinder, thereby causing the plate valves 38 to close both inlet ports of the motor, leaving both exhaust ports open. However at this instant or shortly thereafter, the piston 25' and piston rod 25 begin their return movement, assisted of course by the natural flapping of the rotor blades to which they are connected. This return motion or stroke of the motor piston to the left causes a building up of pressure on the left of piston 46 resulting in the functioning of the valve operating device so as to cause the inlet and exhaust ports on the right of the motor cylinder to be respectively opened and closed. Obviously this cycle of operations will continue as long as power or working fluid is supplied to the motor from a suitable source.

That the apparatus shown in Figure 11, when associated with either the motor 6 or 6', will properly direct and time the power impulses transmitted to the rotor blades, will be apparent from a consideration of the foregoing theory. The only feature which remains to be demonstrated is that the amplitude of flapping will not tend to vary between too wide limits; that is, that the piston will always stop before reaching the end of the cylinder.

It will be understood that the magnitude of the force or pressure applied to the piston 25' is controllable by the pilot and that such control may be accomplished by any common form of throttle or variable pressure device associated with supply line 36. The process by which the rotor is started to rotate and the effects of opening or closing the throttle will now be explained.

It has been shown that the ratio of the flapping speed to the rotational speed of the blades determines the value of the average chord components of the air forces on the blades and that when such average value is acting forwardly the rotational speed of the blades will be increased until a stable condition is again attained, at which point the average chord forces will be substantially zero. In order to increase the lifting force produced by the rotor, it is necessary to increase the rotational velocity of the blades. This can obviously be done by increasing the flapping velocity.

An increase in flapping velocity is associated with two other important features which have been previously disclosed: first, the blades have a natural frequency of flapping corresponding to their rotational velocity, and second, there exist aerodynamic damping forces proportional to both the flapping velocity and to the rotational velocity.

With the ornigyro at rest on the ground, the process of starting consists in giving the rotor a small initial rotational velocity by hand, at the same time also manually causing the blades to start flapping. This starts a slow natural flapping motion which will soon stop unless the pilot opens the throttle. When the throttle is opened, however, the timing mechanism will, as previously shown, permit pressure to be applied to the piston 25' in such a way as to assist the flapping motion of the blades and overcome the aerodynamic damping forces. If the throttle is only slightly opened and the total energy applied to the piston during a stroke just equals the "damping" energy absorbed by the air, the natural frequency of flapping will be maintained and the rotational speed will remain constant. If the throttle is now further opened, the increased pressure on piston 25' will tend to increase the amplitude of flapping.

This has two main effects. First, the damping forces are increased due to the increased flapping velocity. Second, the rotational speed is increased as previously explained, which also increases the damping forces. This second feature also causes a proportional increase in the natural frequency of flapping, so that the damping forces are indirectly still further increased proportional to the rotational speed. The final result will be that the amplitude of flapping will be practically constant, but that an increase of the applied pressure will cause the rotational speed to increase.

It can be seen that the required rate of applying energy (i. e. the power required) is, for a constant amplitude of flapping, proportional to the average damping force overcome during a stroke and to the rate at which the strokes are made. The first of these quantities (average damping force) is proportional to the rotational speed and to the flapping speed, which is itself proportional to the rate of rotation, through the latter's effect on the natural frequency. That is, the average damping force for a stroke is proportional to the square of the rotational speed. The power required is therefore proportional to the cube of the rotation speed for a given amplitude of flapping. This agrees with aerodynamic theory when applied to items having a constant drag coefficient.

It can be inferred, therefore, that the amplitude of flapping would be substantially constant if the profile drag of the blades were the only items to be overcome in causing the rotor to rotate. It will be shown later that the total drag coefficient is not constant and that some increase in amplitude of flapping is to be expected as the power applied is increased. The necessary length of stroke for which the motor must be designed can be determined from a consideration of the maximum power available, so that the piston will always stop before reaching the end of the cylinder.

Thus, it may be appreciated that by reason of the mechanism described, the power impulses transmitted by the motor of either the two or four bladed ornigyro are imparted to the rotor blades at the proper time during the flapping, regardless of the amplitude of flapping. Moreover, it may be observed that the construction and arrangement of the control and valve operating cylinders 44 and 45 is such as to cause the power impulse to be applied in a direction which will assist the flapping of the blades.

In the foregoing it has been assumed that the working fluid is injected into the cylinder during the entire stroke of the motor piston. Although not shown, well within the scope of this invention is the utilization of any expansion properties of the working fluid employed, which includes not only the employment of a number of cylinders, ranging from a high to a low pressure cylinder through which the fluid may pass before being exhausted, but also includes the well known use of a cut-off device for stopping the entrance of fluid under pressure into a cylinder after the piston of such cylinder has moved a predetermined distance. Further it may be realized that where a liquid is employed to furnish the pressure, the connection of the exhaust ports of the motor with a reservoir communicating with the intake side of a pressure or pump mechanism falls well within the scope of my invention. If desired, the necessary pressure in the piston can be supplied by the combustion of fuel within the cylinder, in which case the automatic timing device could be used to govern the action of the conventional valve mechanism used with an internal combustion engine, the operation of the inlet and exhaust valves, in this instance, being determined by the velocity of the piston rather than its position in a cylinder. A multiplicity of separate cylinders working on the internal combustion principle could also be employed without exceeding the scope of the principles and mechanisms herewith disclosed.

As a practical matter one other difficulty of effecting vertical ascent must be considered in the design of the machine already described, namely, the so called "downwash" or induced velocity through the rotor disc. As the sustaining force which supports and elevates the machine is derived solely from the downward acceleration of air, it is obvious that air will be drawn from above the rotor disc and propelled downwardly. The velocity thus acquired by the air passing through the rotor disc is called the induced velocity. This velocity tends to decrease the effective angle of attack of each rotor blade and thereby reduce the sustaining force produced by the rotor. Consequently more power must be applied and a faster rotor speed attained for vertical ascent.

It can be shown, by means of well known aerodynamic theories that the diameter of the rotor disc is the most important feature affecting the induced velocity. This latter is approximately proportional to the rotor diameter, other things being equal. The power required to sustain or lift a given weight may be very largely used up in overcoming the induced velocity. Consequently, for a given net weight and total power there exists an optimum rotor diameter, as the larger rotor will eventually increase the drag of the blades and the total weight to be lifted to such an extent that the reduction in induced velocity is offset and overbalanced by the increase in the rotor weight. Moreover there also exists, for any given total weight to be lifted with a given amount of power, a minimum diameter below which it is impossible to lift the weight with the specified amount of power. It will hence be appreciated by those skilled in the art that, in the design of the ornigyro, the rotor diameter for the total weight to be lifted with a given amount of power must be taken into consideration.

The principles of induced velocity can also be used to show that the smaller the diameter of the rotor, the greater will be the range of flapping amplitude which must be provided for in the design of the aircraft, as it has previously been shown that if the so-called "induced drag" could be eliminated, the amplitude of flapping would remain constant.

The problem of forward speed is closely associated with that of downwash, as the forward tilting of the rotor axis will cause a certain amount of air to be forced downward through the rotor disc, in level flight. The maximum forward speed will, of course, be reached when the maximum power is applied and the magnitude of the speed will depend largely on the total power available, the drag of the body, and the induced power losses. The question of rotor diameter is therefore seen to be a deciding factor in the successful all-around operation of the aircraft.

From the foregoing description it will be appreciated that I have provided a novel set of rotating sustaining surfaces for an aircraft which may not only be applied to the type of craft shown but may be employed with existing aircraft having fixed wings. By means of the constructions disclosed, power may be transmitted to the rotor system without imparting torque directly thereto with a consequent loss of controllability of the aircraft. Moreover, besides providing adjusting means for the blades when they are subjected to unequal lift forces, a simple means for controlling the direction of flight has been disclosed. These facts tend to an aircraft possessing a high over all efficiency, such a craft being easily obtained due to the simplicity of the design, construction, and application of the invention.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention or exceeding the scope of the appended claims.

I claim:

1. A rotating system of sustaining surfaces for an aircraft comprising a rotor mounted on a shaft, the rotor including a bearing with airfoil shaped-blades attached thereto, a power source, and power transmission means operatively connecting the power source to the rotor to effect the rotation of the rotor by oscillating the airfoils of the rotor without changing their geometrical angle of incidence.

2. A rotating system of sustaining surfaces for an aircraft comprising, a rotor mounted on a shaft, the rotor including a bearing with airfoil-shaped blades attached thereto, a power source pivoted to said shaft, and power transmission means operatively connecting said power source to said airfoils for oscillating them and thereby rotating the airfoils about said shaft as an axis without imparting torque directly to the rotor.

3. A rotating system of sustaining surfaces for an aircraft comprising, a rotor mounted to freely rotate on a shaft, said rotor including a bearing with airfoil-shaped blades attached thereto, a power source having a reciprocating power take off mechanism, said power source being pivotally mounted on said shaft, and a plurality of arms pivotally connected to said power take off mechanism, each of said arms being also pivotally connected to an airfoil of the rotor.

4. In an aircraft a lifting and propelling system comprising, a non-rotating shaft mounted on the aircraft for universal movement about some point fixed with respect to the aircraft, a rotor on said shaft, said rotor including a bearing with airfoil-shaped blades attached thereto, said bearing being freely rotatable on the shaft, a power source and power transmission means operatively connecting the same to the blades for imparting a flapping motion to the blades, and means connected to said shaft for adjusting it to desired positions.

5. A rotating system of sustaining surfaces for an aircraft comprising, a rotor mounted to freely rotate on a shaft, said rotor including a bearing, blade-like airfoils attached thereto for universal movement, separate arms connecting each airfoil to an adjacent airfoil, the ends of each airfoil being secured to each airfoil for universal movement, a power source having reciprocating power transmission members, each of said power transmission members being connected to opposite airfoils of the rotor.

6. In a rotor having airfoil-shaped blades capable of being flapped substantially in a plane containing the axis of rotation, the combination of a reciprocating motor for producing flapping of said blades, with a power impulse timing device actuated by the flapping velocity of said blades, said timing device operating means on the motor for causing its actuation.

7. A rotating system of sustaining surfaces for an aircraft comprising, a rotor mounted on a shaft, said rotor including a bearing, airfoil-shaped blades connected to said bearing for flapping movement, a power source, power transmission means operatively connecting the power source to the blades for flapping the same, said power source being floated with respect to the blades so that the latter while capable of being flapped by the power source are at all times free for independent motion by themselves without interfering with the flapping impulses produced by the power source.

8. A rotating system of sustaining surfaces for an aircraft comprising, a self rotating rotor mounted on a shaft, the rotor including a bearing, airfoil-shaped blades connected thereto for flapping movement, a power source, power transmission means operatively connecting the power source to the blades for flapping the same, and a device for timing the flapping impulses imparted by said power source so that said impulses coincide with the natural flapping of said blades.

9. A rotating system of sustaining surfaces for an aircraft comprising, a rotor mounted on a shaft, said rotor including a bearing, airfoil-shaped blades connected to said bearing for flapping movement, a power source, power transmission means operatively connecting the power source to the blades for flapping the same, said power source being floated with respect to the blades so that the latter while capable of being flapped by the power source are at all times free for independent motion without interference with the flapping impulses produced by the power source, and a device for timing the flapping impulses imparted by said power source so that said impulses are delivered at a time and in a direction coincident with the natural period of flapping of said blades, said timing device being actuated by the flapping velocity of the blades.

10. A rotating system of sustaining surfaces for an aircraft comprising, a rotor mounted on a shaft, said rotor including a bearing, airfoil-shaped blades connected to said bearing for flapping movement, a power source, power transmission means operatively connecting the power source to the blades for flapping the same, said power source being floated with respect to the blades so that the latter while capable of being flapped by the power source are at all times free for independent motion without interfering with the flapping impulses produced by the power source and a device for controlling the amplitude of the imparted flapping movement of the blades which simultaneously times the flapping impulses delivered by said power source so that the latter are delivered at a time and in a direction coincident with the natural period of flapping of the blades, said device being actuated by the flapping velocity of the blades.

11. In a rotor having airfoil shaped blades capable of being flapped substantially in a plane containing the axis of rotation, the combination of a reciprocating motor for producing flapping of said blades, with a power impulse timing device, said timing device including a pair of cylinders having inlet and outlet ports connected to each other to form a closed system which is filled with a fluid, a piston and piston rod in each cylinder, means for operatively connecting the piston rod of one cylinder to said blades for causing the movement of the rod and its piston and other means for causing said other piston rod to actuate a mechanism for causing the operation of said power source.

12. A rotating system of sustaining surfaces for an aircraft comprising, a self rotating rotor mounted on a shaft, said rotor including a bearing with airfoil shaped blades connected thereto for flapping movement in a plane at right angles to the transverse axis of the blades, a power source, reciprocating power take off mechanism driven thereby, and means operatively connecting the power take off mechanism with the blades for flapping the same.

13. A rotating system of sustaining surfaces for an aircraft comprising, a rotor mounted on a shaft, said rotor including a bearing, airfoil-shaped blades connected to said bearing, a power source pivoted to said bearing, a reciprocating power take off shaft driven by said power source, an arm for each of said blades, each of said arms being pivotally connected to a blade and to said power take off shaft.

14. A rotating system of sustaining surfaces for an aircraft comprising, a rotor mounted to freely rotate on a shaft, said rotor including a bearing, airfoil-shaped blades, each of said blades being provided with an offset portion which is attached to said bearing for universal movement, separate arms connecting each of said blades to an adjacent blade, the connection for each blade being by a universal connection, and a power source having reciprocating power transmission members, said power source being carried by the rotor as a unit, each of said power transmission members being connected to opposite blades of the rotor.

15. A rotating system of sustaining surfaces for an aircraft comprising, a rotor mounted on a shaft, the rotor including a bearing having airfoil-shaped blades pivoted thereto, each of said airfoils being pivoted about a transverse axis thereof so as to be capable of arcuate movement, a power source pivotally mounted on said shaft, and power transmission means operatively connecting the same to the blades for imparting a flapping motion to said blades.

FRANCIS R. SHANLEY.